(12) United States Patent
Seo et al.

(10) Patent No.: US 10,880,904 B2
(45) Date of Patent: Dec. 29, 2020

(54) COMMUNICATION TECHNIQUE SETTING METHOD FOR DEVICE-TO-DEVICE DIRECT COMMUNICATION IN WIRELESS COMMUNICATION SYSTEM, AND DEVICE THEREFOR

(71) Applicant: LG Electronics Inc., Seoul (KR)

(72) Inventors: Hanbyul Seo, Seoul (KR); Byounghoon Kim, Seoul (KR); Seungmin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/089,966

(22) PCT Filed: Mar. 27, 2017

(86) PCT No.: PCT/KR2017/003243
§ 371 (c)(1),
(2) Date: Sep. 28, 2018

(87) PCT Pub. No.: WO2017/171321
PCT Pub. Date: Oct. 5, 2017

(65) Prior Publication Data
US 2019/0159218 A1 May 23, 2019

Related U.S. Application Data

(60) Provisional application No. 62/405,206, filed on Oct. 6, 2016, provisional application No. 62/377,581, filed
(Continued)

(51) Int. Cl.
*H04W 72/10* (2009.01)
*H04W 4/46* (2018.01)
(Continued)

(52) U.S. Cl.
CPC .............. *H04W 72/10* (2013.01); *H04W 4/46* (2018.02); *H04W 4/70* (2018.02); *H04W 24/08* (2013.01);
(Continued)

(58) Field of Classification Search
None
See application file for complete search history.

(56) References Cited

U.S. PATENT DOCUMENTS

2014/0342747 A1  11/2014  Lee et al.
2016/0100345 A1*  4/2016  Thangarasa ............... H04L 5/00
                                                      370/332
(Continued)

FOREIGN PATENT DOCUMENTS

KR  10-0889741     3/2009
WO  2013/109100    7/2013

OTHER PUBLICATIONS

International Search Report in International Application No. PCT/KR2017/003243, dated Jul. 5, 2017, 13 pages (with English Translation).
(Continued)

*Primary Examiner* — Brian S Roberts
(74) *Attorney, Agent, or Firm* — Fish & Richardson P.C.

(57) ABSTRACT

Disclosed in the present application is a method by which a terminal determines a communication technique in a wireless communication system. Particularly, the communication technique determining method comprises the steps of: transmitting/receiving a signal through a first channel by using a first communication technique; confirming whether a second communication technique using a second channel is used in a monitoring gap; and transmitting/receiving a signal through the second channel by using the first communication technique, if it is confirmed that the second
(Continued)

communication technique using the second channel is not used, wherein the use of the first communication technique through the second channel is prohibited in the monitoring gap.

19 Claims, 8 Drawing Sheets

Related U.S. Application Data on Aug. 20, 2016, provisional application No. 62/314,975, filed on Mar. 29, 2016.

(51) Int. Cl.
*H04W 72/02* (2009.01)
*H04W 4/70* (2018.01)
*H04W 24/08* (2009.01)
*H04W 72/04* (2009.01)

(52) U.S. Cl.
CPC ....... *H04W 72/02* (2013.01); *H04W 72/0446* (2013.01); *H04W 72/0486* (2013.01)

(56) References Cited

U.S. PATENT DOCUMENTS

2017/0280436 A1* 9/2017 Park ................. H04L 1/00
2017/0295579 A1* 10/2017 Sheng ............... H04W 64/00
2017/0332352 A1* 11/2017 Sheng ............... H04L 67/12

OTHER PUBLICATIONS

Lei Deng et al., 'Device-to-Device Load Balancing for Cellular Networks', Mobile Ad Hoc and Sensor Systems (MASS), 2015 IEEE 12th International Conference on, Jan. 7, 2016, 13 pages.

Catt, "Considerations on V2X Congestion," 'R2-161188', 3GPP TSG RAN WG2 Meeting #93, St. Julian's, Malta, Feb. 15-19, 2016, 3 pages.

* cited by examiner (A) CONTROL-PLANE PROTOCOL STACK (B) USER-PLANE PROTOCOL STACK

COMMUNICATION TECHNIQUE SETTING METHOD FOR DEVICE-TO-DEVICE DIRECT COMMUNICATION IN WIRELESS COMMUNICATION SYSTEM, AND DEVICE THEREFOR

CROSS-REFERENCE TO RELATED APPLICATIONS

This application is a National Stage application under 35 U.S.C. § 371 of International Application No. PCT/KR2017/003243, filed on Mar. 27, 2017, which claims the benefit of U.S. Provisional Application No. 62/405,206, filed on Oct. 6, 2016, U.S. Provisional Application No. 62/377,581, filed on Aug. 20, 2016, and U.S. Provisional Application No. 62/314,975, filed on Mar. 29, 2016. The disclosures of the prior applications are incorporated by reference in their entirety.

TECHNICAL FIELD

The present invention relates to a wireless communication system, and more particularly, to a method of configuring a communication technique for performing direct communication between user equipments in a wireless communication system and an apparatus therefor.

BACKGROUND ART

A brief description will be given of a 3rd Generation Partnership Project Long Term Evolution (3GPP LTE) system as an example of a wireless communication system to which the present invention can be applied.

FIG. 1 illustrates a configuration of an Evolved Universal Mobile Telecommunications System (E-UMTS) network as an exemplary wireless communication system. The E-UMTS system is an evolution of the legacy UMTS system and the 3GPP is working on the basics of E-UMTS standardization. E-UMTS is also called an LTE system. For details of the technical specifications of UMTS and E-UMTS, refer to Release 7 and Release 8 of "3rd Generation Partnership Project; Technical Specification Group Radio Access Network", respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously, for broadcast service, multicast service, and/or unicast service.

A single eNB manages one or more cells. A cell is set to operate in one of the bandwidths of 1.25, 2.5, 5, 10, 15 and 20 Mhz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency area in which the DL data is supposed to be transmitted, a coding scheme, a data size, Hybrid Automatic Repeat reQuest (HARQ) information, etc. by transmitting DL scheduling information to the UE. Regarding UL data, the eNB notifies a particular UE of a time-frequency area in which the UE can transmit data, a coding scheme, a data size, HARQ information, etc. by transmitting UL scheduling information to the UE. An interface for transmitting user traffic or control traffic may be defined between eNBs. A Core Network (CN) may include an AG and a network node for user registration of UEs. The AG manages the mobility of UEs on a Tracking Area (TA) basis. A TA includes a plurality of cells.

While the development stage of wireless communication technology has reached LTE based on Wideband Code Division Multiple Access (WCDMA), the demands and expectation of users and service providers are increasing. Considering that other radio access technologies are under development, a new technological evolution is required to achieve future competitiveness. Specifically, cost reduction per bit, increased service availability, flexible use of frequency bands, a simplified structure, an open interface, appropriate power consumption of UEs, etc. are required.

DISCLOSURE OF THE INVENTION

Technical Task

Based on the aforementioned discussion, a method of configuring a communication technique for performing direct communication between user equipments in a wireless communication system and an apparatus therefor are proposed in the following description.

Technical Solution

To achieve these and other advantages and in accordance with the purpose of the present invention, as embodied and broadly described, according to one embodiment, a method of determining a communication technique, which is determined by a user equipment (UE) in a wireless communication system, includes the steps of transmitting and receiving a signal using a communication technique 1 via a channel 1, checking whether or not a communication technique 2 via a channel 2 is used within a monitoring gap; and if it is checked that the communication technique 2 via the channel 2 is not used, transmitting and receiving a signal using the communication technique 1 on the channel 2. In this case, the use of the communication technique 1 via the channel 2 can be prohibited within the monitoring gap.

To further achieve these and other advantages and in accordance with the purpose of the present invention, according to a different embodiment, a user equipment in a wireless communication system includes a radio communication module and a processor configured to be connected with the radio communication module, the processor configured to check whether or not a communication technique 2 via a channel 2 is used within a monitoring gap in the middle of transmitting and receiving a signal using a communication technique 1 via a channel 1, the processor, if it is checked that the communication technique 2 via the channel 2 is not used, configured to transmit and receive a signal using the communication technique 1 on the channel 2. In this case, the use of the communication technique 1 via the channel 2 can be prohibited within the monitoring gap.

Preferably, the communication technique 2 has the top priority on the channel 2 and the communication technique 1 has the top priority on the channel 1.

More preferably, the method can further include the step of checking whether or not a communication technique 3 via a channel 3 is used within the monitoring gap. In this case, the use of the communication technique 1 via the channel 3 is prohibited within the monitoring gap and the communication technique 3 has the top priority on the channel 3.

In particular, a monitoring gap for checking whether or not the communication technique 3 is used can be defined by a time offset for a monitoring gap for checking whether or not the communication technique 2 is used.

Or, checking whether or not the communication technique 2 is used and checking whether or not the communication technique 3 is used can be performed within a common monitoring gap.

Advantageous Effects

According to embodiments of the present invention, it is able to efficiently configure a communication technique for performing direct communication between user equipments.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

BEST MODE

Mode for Invention

The configuration, operation, and other features of the present disclosure will readily be understood with embodiments of the present disclosure described with reference to the attached drawings. Embodiments of the present disclosure as set forth herein are examples in which the technical features of the present disclosure are applied to a 3rd Generation Partnership Project (3GPP) system.

While embodiments of the present disclosure are described in the context of Long Term Evolution (LTE) and LTE-Advanced (LTE-A) systems, they are purely exemplary. Therefore, the embodiments of the present disclosure are applicable to any other communication system as long as the above definitions are valid for the communication system. In addition, while the embodiments of the present disclosure are described in the context of Frequency Division Duplexing (FDD), they are also readily applicable to Half-FDD (H-FDD) or Time Division Duplexing (TDD) with some modifications.

The term 'Base Station (BS)' may be used to cover the meanings of terms including Remote Radio Head (RRH), evolved Node B (eNB or eNode B), Reception Point (RP), relay, etc.

Figure 1:
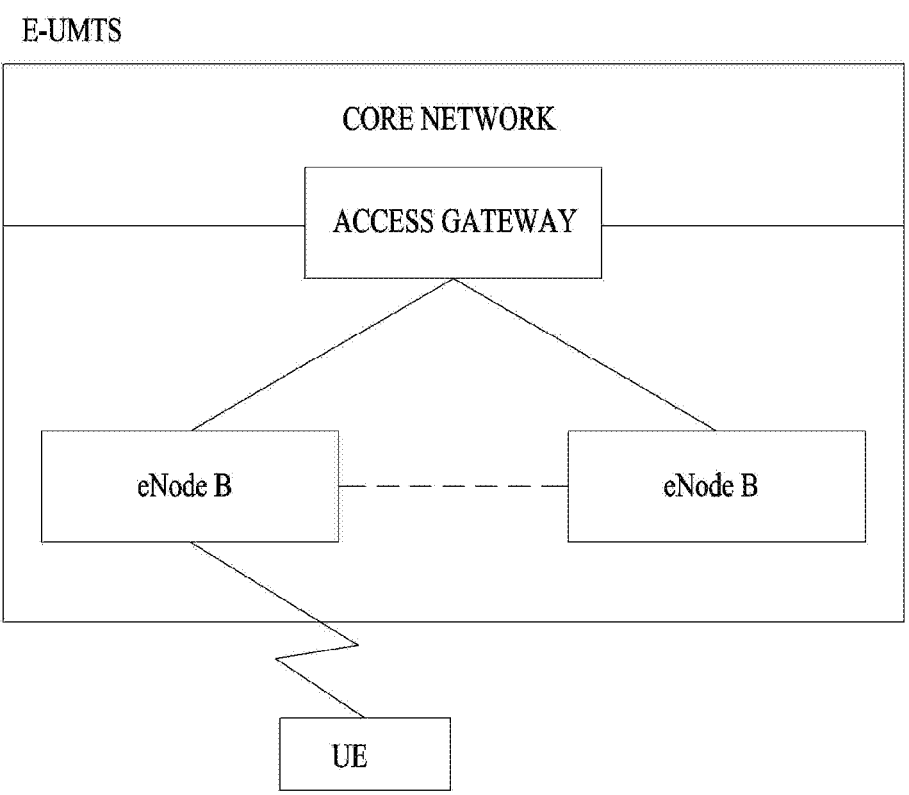
FIG. 1 illustrates a configuration of an Evolved Universal Mobile Telecommunications System (E-UMTS) network as an example of a wireless communication system.
Figure 2:
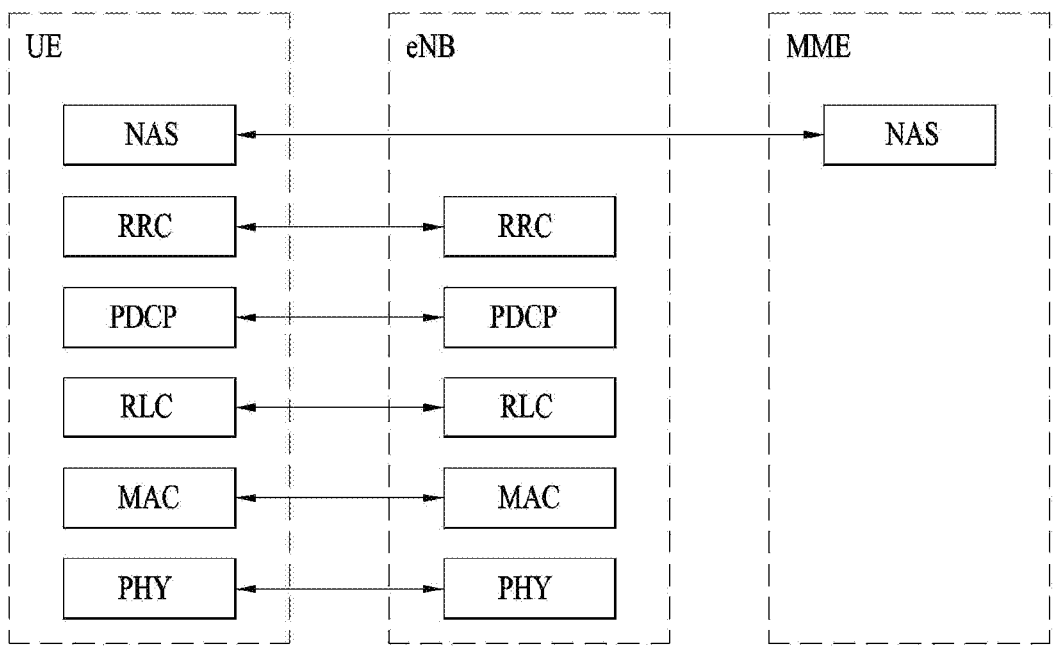
FIG. 2 illustrates a control-plane protocol stack and a user-plane protocol stack in a radio interface protocol architecture conforming to a 3rd Generation Partnership Project (3GPP) radio access network standard between a User Equipment (UE) and an Evolved UMTS Terrestrial Radio Access Network (E-UTRAN)
Figure 2:
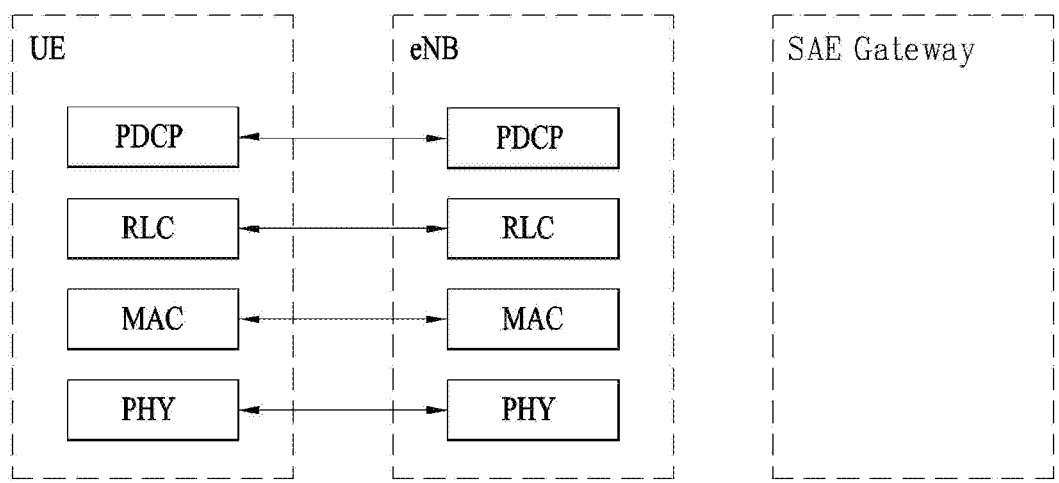

FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

One cell configuring a base station (eNB) provides a downlink or uplink transmission service to several UEs using any one of bandwidths of 1.25, 2.5, 5, 10, 15 and 20 MHz. Different cells may be set to provide different bandwidths.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
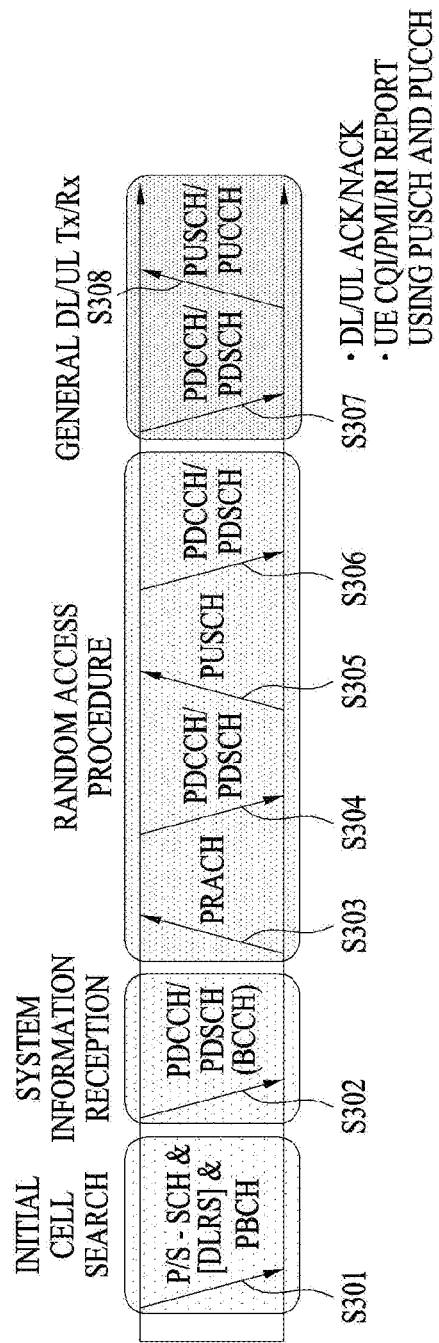
FIG. 3 illustrates physical channels and a general signal transmission method using the physical channels in a 3GPP system.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 4:
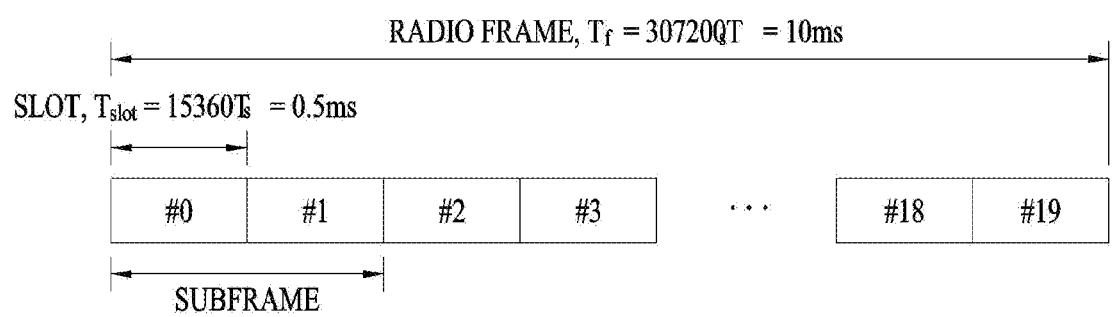
FIG. 4 illustrates a structure of a radio frame in a Long Term Evolution (LTE) system.

FIG. 4 illustrates a structure of a radio frame used in the LTE system.

Referring to FIG. 4, a radio frame is 10 ms ($327200 \times T_s$) long and divided into 10 equal-sized subframes. Each subframe is 1 ms long and further divided into two slots. Each time slot is 0.5 ms ($15360 \times T_s$) long. Herein, $T_s$ represents a sampling time and $T_s=1/(15 \text{ kHz} \times 2048)=3.2552 \times 10^{-8}$ (about 33 ns). A slot includes a plurality of Orthogonal Frequency Division Multiplexing (OFDM) symbols or SC-FDMA symbols in the time domain by a plurality of Resource Blocks (RBs) in the frequency domain. In the LTE system, one RB includes 12 subcarriers by 7 (or 6) OFDM symbols. A unit time during which data is transmitted is defined as a Transmission Time Interval (TTI). The TTI may be defined in units of one or more subframes. The above-described radio frame structure is purely exemplary and thus the number of subframes in a radio frame, the number of slots in a subframe, or the number of OFDM symbols in a slot may vary.

Figure 5:
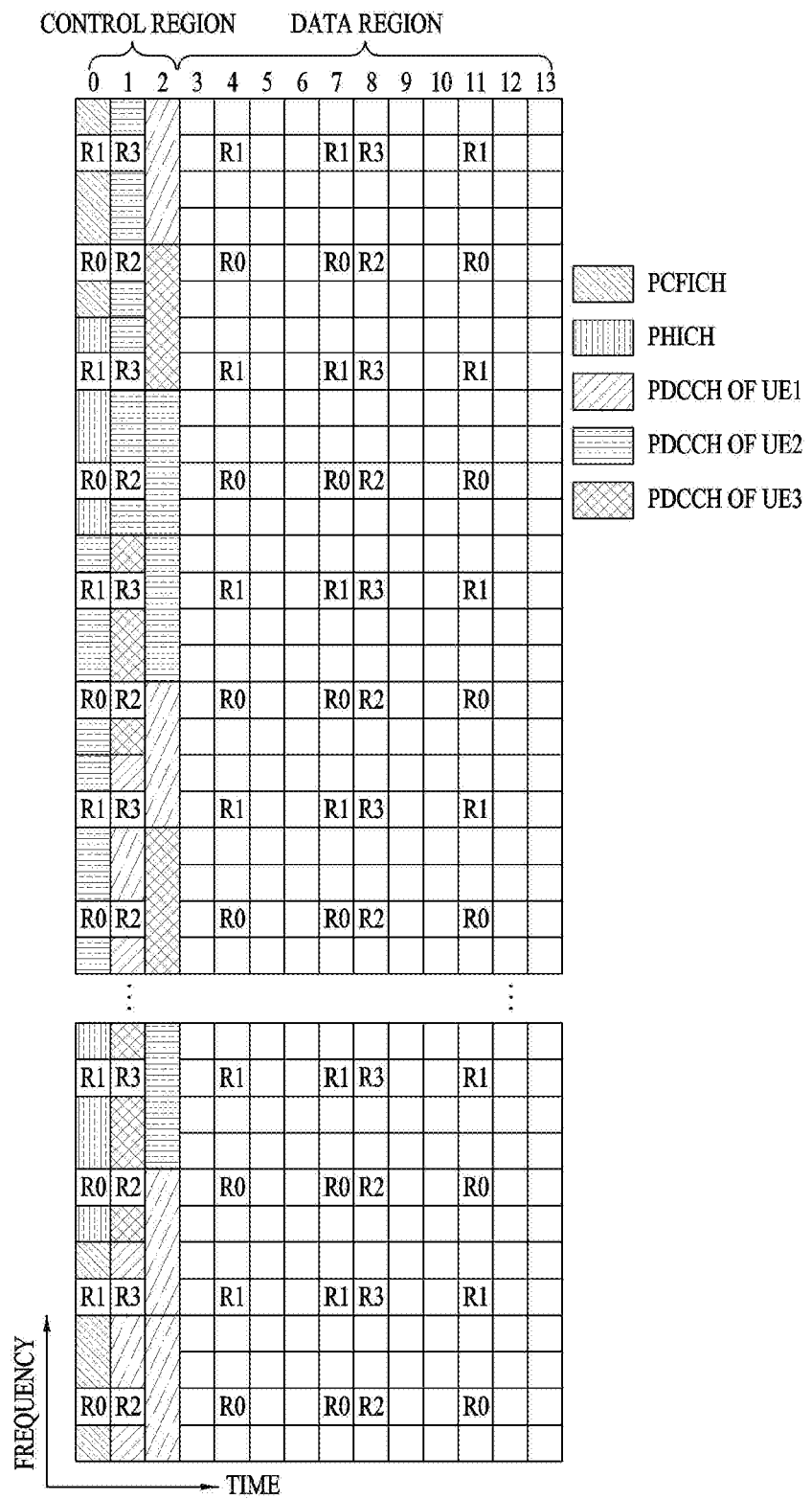
FIG. 5 illustrates a structure of a downlink radio frame in the LTE system.

FIG. 5 illustrates exemplary control channels included in a control region of a subframe in a DL radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identity (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A"

and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 6:
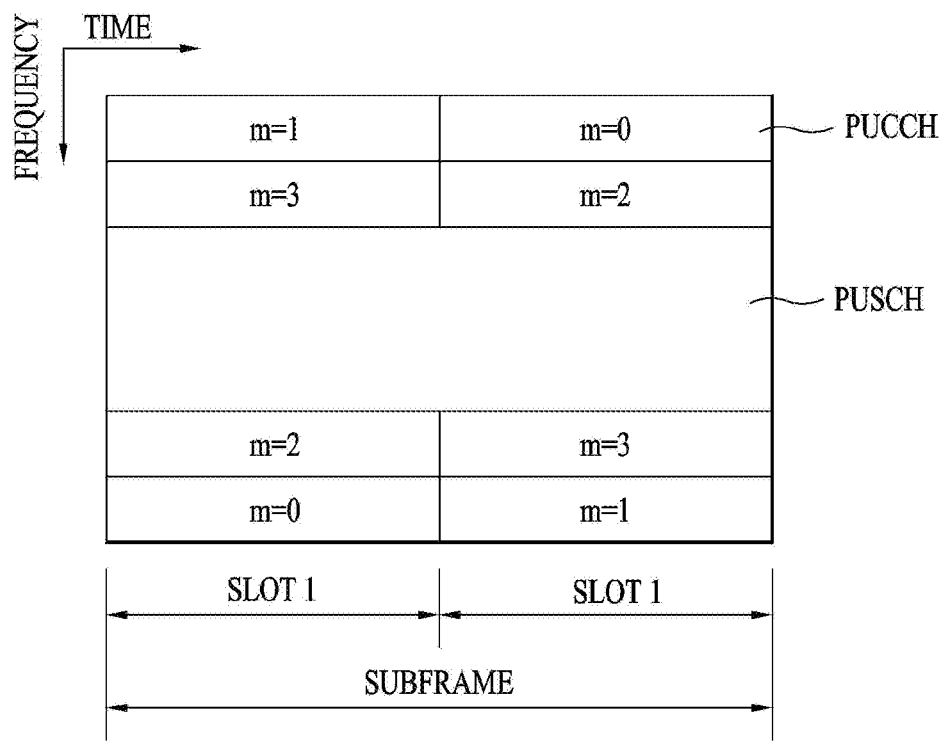
FIG. 6 illustrates a structure of an uplink subframe in the LTE system.

FIG. 6 illustrates a structure of a UL subframe in the LTE system.

Referring to FIG. 6, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for Multiple Input Multiple Output (MIMO), a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, and m=2 are allocated to a subframe in FIG. 6.

Figure 7:
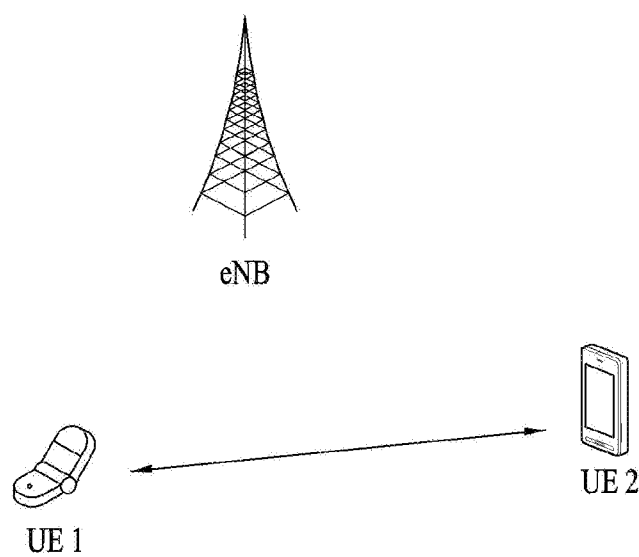
FIG. 7 is a diagram for a simplified D2D communication network.

FIG. 7 is a diagram illustrating the concept of device-to-device (D2D) communication.

Referring to FIG. 7, during D2D communication (i.e., D2D direct communication) in which the UE wirelessly communicates with another UE, the eNB may transmit a scheduling message for indicating D2D transmission/reception. The UE participating in D2D communication may receive a D2D scheduling message from the eNB, and performs Tx/Rx operations indicated by the D2D scheduling message. Here, although a UE means a user terminal, a network entity such as an eNB may be regarded as a UE when transmitting and receiving a signal according to a communication method between UEs. And, an eNB can receive a D2D signal transmitted by a UE. A UE can apply a method of transmitting and receiving a signal of the UE designed to perform D2D transmission to an operation of transmitting an uplink signal to an eNB.

Hereinafter, a link directly linked between UEs is referred to as a D2D link and a link for communication between a UE and an eNB is referred to as an NU link. Or, the link directly linked between UEs can also be referred to as a sidelink (SL) as a concept in comparison with UL and DL.

When a D2D signal is transmitted, it may consider various communication techniques described in the following. It is highly probable that the communication techniques described in the following are to be applied to D2D communication between vehicles, by which the present invention may be non-limited. Although a different communication technique is used, the principle of the present invention can be applied as well.

1) IEEE 802.11p—A D2D communication technique applied to DSRC (Dedicated Short Range Communication). A transmission UE transmits data when a channel becomes idle as much as a backoff value after random backoff is performed.

2) LTE SL—A D2D communication technique operating using a sidelink of LTE. When a different UE receives a control message or senses energy, data is transmitted using a resource unlikely to be used by the different UE.

3) eSL (enhanced SL)—A technique for enhancing SL of LTE. The present technique may have additional functions such as utilizing multiple antennas, increasing subcarrier spacing to robust to Doppler effect in fast moving situation, reducing a TTI length to quickly transmit data, introducing HARQ-ACK in response to SL data transmission, and the like.

Meanwhile, when a vehicle safety message is exchanged via D2D communication between vehicles, if an adjacent vehicle successfully transmits and receives the safety message using the same communication technique, it is able to reduce occurrence of an accident. In this case, each of the vehicles can be equipped with a different D2D communication technique. In particular, since the timing at which the aforementioned communication technique is actually used is not the same, a vehicle manufactured long time ago is equipped with a previously manufactured communication technique only, whereas a recently manufactured vehicle can be equipped with various types of communication techniques.

In this case, the vehicle equipped with various types of communication techniques can determine a communication technique to be used by the vehicle according to a situation of a nearby vehicle, i.e., according to a communication technique used by the nearby vehicle examined by the vehicle. The vehicle equipped with various types of communication techniques performs D2D communication using a recently developed communication technique having good performance. In this case, if the vehicle discovers a vehicle using a previously developed different communication technique, for example, if the vehicle senses a specific signal used in a different communication technique, the vehicle switches to the different communication technique to perform communication with the vehicle using the previously developed different communication technique.

For example, a UE operating with eSL senses an LTE SL signal or an IEEE 802.11p signal, the UE switches to the sensed communication technique to perform vehicle-to-vehicle (V2V) communication. As a different example, a UE operating with LTE SL senses an IEEE 802.11p signal, the UE switches to the sensed communication technique and can perform V2V communication.

When a UE switches a communication technique, the UE informs other UEs communicating with a legacy communication technique of the communication technique switched by the UE to continuously perform communication with other UEs. Or, the UE informs a base station of the switched communication technique and the base station can disseminate the communication technique to nearby UEs. The UE may inform the base station of the switching of the communication technique of the UE or may inform the base station of information on a communication technique sensed by the UE. If a UE switches a communication technique of relatively good performance into a communication technique of lower performance, danger of an accident can be increased due to a communication error. In this case, it may be able to control a driving parameter of a vehicle to prepare for the communication error. For example, it may be able to perform an operation of increasing a distance between vehicles, an operation of reducing vehicle speed, and the like.

In the aforementioned operation, it may be able to use a preamble, which is transmitted prior to every packet, as a signal for sensing IEEE 802.11p. And, it may be able to use a control message and/or a reference signal, which schedules a synchronization signal or data transmission, as a signal for sensing SL or eSL. In particular, since a synchronization signal or a reference signal uses a predefined sequence, it may have a merit in that it is relatively easy to sense a different UE.

The aforementioned operation is more generally explained. A communication technique capable of being used on a specific frequency of a specific region may have a top priority. A UE uses a communication technique of performance as high as possible on a specific frequency of a specific region. If an operation of a communication technique having a higher priority is sensed, the UE can switch to the communication technique.

As a variation of the aforementioned operation, when a UE switches a communication technique, the UE may be able to receive a signal only with the switched communication technique while signal transmission is not performed using the switched communication technique. In particular, since signal transmission is performed using a single communication technique only, it is able to reduce implementation cost of the UE. In this case, since transmission of an important message of a vehicle can be terminated, it may be able to control a vehicle driving parameter to reduce danger of an accident.

If the aforementioned operation is performed, a switching between communication techniques can be excessively and frequently performed. In order to prevent a communication technique from being excessively switched, a communication technique to be used at a specific position or a specific frequency can be designated in advance. For example, the entire region is divided into a plurality of regions and a communication technique to be used in each of a plurality of the regions is designated in advance. A UE identifies information on a communication technique to be used in each of the regions from a base station or other device. If the UE recognizes that the UE is located at a specific region, the UE uses a communication technique designated to be used in the specific region. Meanwhile, if the number of communication techniques designated in a specific region corresponds to 1, although the use of the communication technique is not detected, the use of a different communication technique can be prohibited to prevent performance deterioration capable of being occurred when detection of the communication technique fails.

In addition, the use of a plurality of communication techniques can be permitted on a specific frequency of a specific position. In this case, a communication technique to be used by each UE can be determined according to the aforementioned method. For example, if IEEE 802.11p is detected at a specific region, a UE uses the IEEE 802.11p. Otherwise, the UE uses LTE SL or eSL. As a different example, if LTE SL or eSL is detected at a specific region, a UE uses the LTE SL or the eSL. Otherwise, the UE uses IEEE 802.11p.

When a plurality of communication techniques are permitted on a specific frequency of a specific position and a UE applies a communication technique according to a detected communication technique, it can be represented as a priority exists between communication techniques permitted on the specific frequency of the specific position. For example, if IEEE 802.11p is detected at a specific region, a UE uses the IEEE 802.11p. Otherwise, the UE uses LTE SL or eSL. In this case, the operation above can be defined as the IEEE 802.11p has a top priority in the specific region. If the existence of the IEEE 802.11p is discovered, the UE is prohibited to use a communication technique rather than the IEEE 802.11p. It may allow the UE to use LTE SL or eSL only when the IEEE 802.11p having the top priority does not exist.

In this case, in order to make a communication technique not having the top priority continuously perform an operation in a corresponding region, it is preferable to configure a different communication technique to have top priority on a different frequency. In particular, it is preferable to preferentially use a specific communication technique on a frequency at which the specific communication technique having the top priority is configured. It may temporarily attempt to use a frequency at which a different communication technique having the top priority is configured only when a resource is not sufficient at the frequency at which the specific communication technique having the top priority is configured.

More specifically, assume that a communication technique 1 has top priority on a frequency A in a specific region and a communication technique 2 has top priority on a frequency B. If load applied to a frequency using a communication technique is not high, the communication technique may operate without any mutual interference on the frequency where the communication technique has the top priority. In this case, if the number of UEs intending to use the communication technique 1 increases and the load of the frequency A is equal to or greater than a prescribed level, the UEs intending to use the communication technique 1 may consider additionally using the frequency B. If a part of UEs (e.g., stochastically selected UEs) identify that the communication technique 2 is not used on the frequency B, the UEs use the communication technique 1 via the frequency B to reduce the load on the frequency A. However, if the load of the frequency A is equal to or less than the prescribed level, although the UEs identify that the communication technique 2 is not used on the frequency B, the UEs can be prohibited to use the communication technique 1 on the frequency B. This is aimed at considering the possibility of occurrence of an error in identifying whether or not the communication technique 2 exists.

The operation above can also be applied to a case that communication techniques different from each other are distinguished from each other while using a different time section on the same frequency band. In particular, a plurality of resource pools each of which has a specific time/frequency region are defined and a communication technique having the top priority in each resource pool can be designated. If a communication technique to be used by a UE has top priority in a resource pool, the UE preferentially uses the resource pool. However, if load of the resource pool is equal to or greater than a prescribed level, the UE may consider using a resource pool where a different communication technique has top priority. If it is determined that a different communication technique does not exist in a corresponding resource pool, it may be able to configure a part of UEs to use the resource pool. When a communication technique having a priority rather than the top priority is permitted in each resource pool, whether or not the communication technique is permitted can be appropriately configured by a network including a base station.

More generally, a resource pool can be divided into a plurality of sub-resource pools and whether or not a communication technique having a priority rather than the top priority is permitted can be differently configured. In the aforementioned example, the frequency A where the communication technique A has the top priority is defined as a resource pool A and the frequency B where the communication technique B has the top priority can be defined as a resource pool B. In this case, the resource pool A and the resource pool B can be divided into sub-resource pools A-1 and A-2, and sub-resource pools B-1 and B-2, respectively.

In this case, assume that the communication technique 2 is not used in the resource pool B. If load of the resource pool A is equal to or greater than X1, it may be able to configure the communication technique 1 to be used in the sub-resource pool B-1. If the load of the resource pool A is equal to or greater than X2, it may be able to configure the communication technique 1 to be used in the sub-resource pool B-1.

In this case, if X2 is greater than X1 and the load of the resource pool A is greater than the X1 and less than the X2, it may be able to define the communication technique 1 to be used in the sub-resource pool B-1 only. By doing so, unless load is extremely high, it may be able to configure the communication technique 2 to be used in a part of sub-resource pools without any influence. If the X2 is configured by the maximum value of a load measurement value, it is unable to use the communication technique 1 in the sub-resource pool B-2 under any circumstance.

A similar operation can also be applied to a communication technique having the top priority. For example, in case of the communication technique 1, in order to preferentially use the sub-resource pool A-1, the sub-resource pool A-2 can be used by the communication technique 1 only when the load of the sub-resource pool A-1 is equal to or greater than a prescribed level. In particular, when the load of using the communication technique 1 is low, the communication technique 1 is not used in the sub-resource pool A-2. As a result, there is a possibility of using the communication technique 2.

To this end, when a plurality of resource pools are configured, it may be able to determine a communication technique and a priority of the communication technique capable of being used in each of a plurality of the resource pools. And, it is able to designate a condition for using a specific communication technique in each resource pool. More specifically, it is able to designate a condition for load in a different resource pool. In order for a UE to use a specific resource pool with a specific communication technique, it is necessary to satisfy not only a load condition designated to the specific resource pool (i.e., a condition that load of a resource pool having a higher priority is equal to or greater than a prescribed level) but also a condition that a different communication technique having a higher priority is not detected in the specific resource pool.

Meanwhile, a part of data transmitted by a UE can be transmitted with a switched communication technique according to the aforementioned method. However, it may be inappropriate to transmit a specific data with the switched communication technique. For example, since V2V (vehicle-to-vehicle) communication for performing an autonomous driving service or a platooning service following a car ahead with a close interval requires very sophisticated communication, it is necessary to transmit and receive a message with a communication technique such as eSL. In this situation, if a different communication technique has top priority in a specific region and a specific frequency and the use of the different communication technique is designated/detected, a UE may attempt to continuously perform communication via a communication technique of a lower priority (i.e., eSL) using a different frequency. In this case, if a plurality of UEs move to a different frequency, although the same communication technique is used, since an operating frequency varies, it is difficult to reliably perform communication. Hence, it is necessary to have a method of configuring a plurality of UEs to quickly move to the same frequency.

In order to solve the problem above, a specific UE configures a frequency to which the specific UE to move and can inform nearby UEs of the frequency. The specific UE may correspond to a UE which has firstly detected a communication technique of a higher priority among the nearby UEs. In this case, in order to prevent a different UE from detecting a different communication technique and moving to a different frequency, it may be able to designate a priority for a frequency position to move in advance. In particular, when a UE operates on a frequency #1, the UE may select candidates of a frequency to which the UE is going to move when the frequency #1 is unavailable and designates a priority to each of the candidates (e.g., a frequency #2, a frequency #3, etc.). If it is unable to use the frequency #1, the UE can use an available frequency among the candidates. In other word, the UE can use a frequency having the highest priority among frequencies on which the use of a communication technique of a higher priority is not designated/detected. In particular, if communication of the UE suddenly disappears on a specific channel, other UEs attempt to search for a channel of a higher priority from the candidates and may be able to promptly identify whether or not UEs move to the channel.

As a different method, it may be able to designate a UE, which configures a frequency to move, in advance. In particular, similar to a vehicle driving at the forefront in a platooning service, a UE having a preferred status compared to a different UE may exist in services and communication. The UE can designate a frequency to which the UE is going to move. In this case, the different UE can report information on whether or not a different communication technique is detected to the UE.

When a vehicle performs the autonomous driving or the platooning service, it is preferable for the vehicle to notify a nearby vehicle that the service is operating. By doing so, it may be able to prevent the nearby vehicle from cutting in between vehicles performing the autonomous driving or the platooning service. The notification can be performed via D2D communication between vehicles. Or, in order to make a driver of a different vehicle check the notification, it may be able to operate a specific signaling device installed in a vehicle (e.g., a device emitting light of a specific color or generating a specific sound).

Although the aforementioned operation is performed, if there is no available frequency, a UE is unable to continuously perform a communication technique of a lower priority. In this case, the UE can notify the fact to a base station or a nearby UE. When the UE notifies the fact to the base station, the UE may attempt to perform communication via the base station. Or, since it is unable to perform sophisticated communication, the UE stops a service requiring the sophisticated communication (e.g., autonomous driving or platooning service) and may be then able to switch to normal driving.

Meanwhile, in case of performing D2D using a plurality of channels, it is able to perform prompt channel switching when a currently used channel is not available anymore by consistently identifying a status (e.g., whether or not a communication technique having a higher priority already exists, etc.) of a different channel. However, if circuits necessary for a UE to monitor a communication status are implemented as many as the number of all channels, implementation cost is too high. Hence, it is necessary to efficiently monitor the entire channels with the limited number of monitoring circuits. A specific method is described in the following.

First of all, a monitoring gap can be configured in advance for monitoring of a UE. The monitoring gap corresponds to a time region that transmission/reception of a signal using a specific communication technique is prohibited. A UE can perform monitoring on whether or not a channel and/or a different channel use a different communication technique during the monitoring gap. In particular, in case of performing monitoring on whether or not IEEE 802.11p is used on a specific channel, it is determined as the specific channel is idle and transmission based on IEEE 802.11p is available only when transmission of LTE SL or transmission of eSL does not exist on the specific channel. In particular, in order to determine whether or not IEEE 802.11p is used, the monitoring gap is essential.

In this case, it may be able to define a rule that the monitoring gap is configured at the different timing of each channel. For example, when a monitoring gap is configured on a specific channel, a monitoring gap of a different channel can be configured in a form that a time offset is applied to the monitoring gap of the specific channel. In this case, since a monitoring gap is configured for a single specific channel only at the single timing, it may apply a single monitoring circuit to a different channel according to time. Consequently, it may be able to monitor all channels.

As a different example, when a monitoring gap is commonly set to the entire channels, if a length of the monitoring gap is configured to be sufficiently long, a UE can alternately monitor many channels in the common monitoring gap.

If a communication technique having the top priority is detected on a specific channel, the use of a different communication technique on a channel adjacent to the specific channel can be prohibited. Due to the characteristic of D2D communication, transmission of a specific UE may act as strong interference to a UE very close to the specific UE. The interference may become valid interference even when the two UEs are positioned at a different channel. In this case, when a different communication technique is detected on a channel, the use of a communication technique rather than the detected communication technique on a channel adjacent to the channel can be restricted. The restriction on the adjacent channel can be determined according to a size of a detected signal. For example, the use of the adjacent channel can be restricted only when a signal is received by reception power equal to or greater than a prescribed level.

When a priority of a communication technique is provided to a frequency band or a resource pool and a UE operates according to the priority, the priority of the communication technique can be flexibly determined according to a communication status without being designated in advance. For example, if a transmission occurrence frequency or a load status using a communication technique is equal to or less than a prescribed level including a status that no communication is performed on a specific frequency band or a resource pool, a plurality of communication techniques have the same priority. On the other hand, if communication equal to or greater than the prescribed level occurs, a communication technique generating more transmissions may have a higher priority.

In particular, when a UE attempts to use a specific frequency band or a resource pool, the UE measures a frequency/load of communication techniques on the band/pool. If it is determined that a communication technique having the highest frequency/load exists with a frequency/load equal to or greater than a prescribed level, the UE assumes that the communication technique having the highest frequency/load has the top priority on the band/resource pool. If the communication technique having the highest frequency/load exists in a plurality of bands/pools, the UE preferentially uses a band/pool existing with a higher frequency/load among a plurality of the bands/pools. In this case, if a congestion status of the band/pool is serious, the band/pool is excluded. The UE can use a band/pool having a next higher frequency/load. In particular, as mentioned in the foregoing description, the UE considers that a communication technique uses a band/pool having the top priority. If a congestion status of the band/pool is serious, the communication technique may use a band/pool having the second highest priority. In particular, since a specific communication technique is concentrated on a specific band/pool, it may be able to obtain an effect that a different communication technique naturally occupies a different band/pool.

As a specific example, assume that bands 1 to 3 exist and a specific UE attempts to perform transmission using a communication technique A. If the UE identifies that the existence of the communication technique A is detected on the band 1 and no communication technique exist on the bands 2 and 3, the UE assumes that the communication technique A corresponds to a communication technique having the top priority on the band 1. In particular, if a load status is not serious on the band 1, the communication technique A performs transmission using the band 1. If the load status is serious on the band 1, the communication technique A attempts to perform transmission using the band 2 or the band 3 having the second highest priority (i.e., a priority identical to a different communication technique). If a communication technique B is detected on the band 2, the UE assumes that the communication technique B has the top priority on the band 2. If a load status is not serious on the band 1, the band 1 is used. If the load status is serious, the communication technique A uses the band 3 having the second highest priority.

Figure 8:
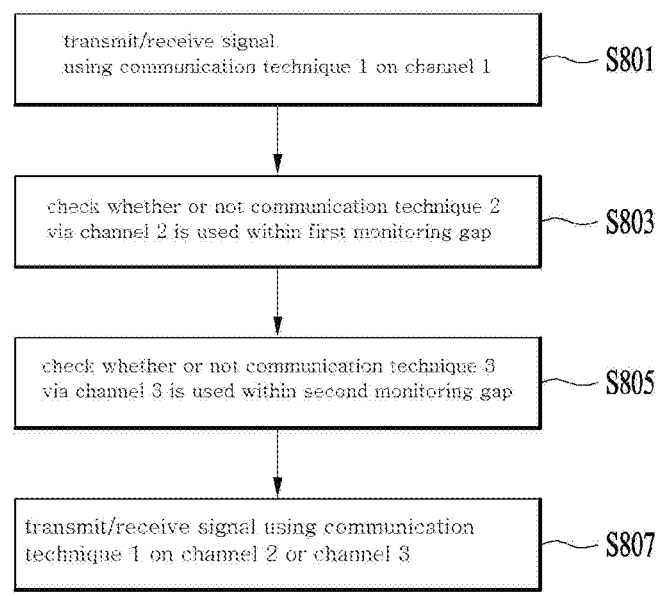
FIG. 8 is a flowchart for a method of configuring a communication technique for performing direct communication between user equipments according to an embodiment of the present invention.

FIG. 8 is a flowchart for a method of configuring a communication technique for performing direct communication between user equipments according to an embodiment of the present invention.

Referring to FIG. 8, a UE assumes that a signal is transmitted and received on a channel 1 using a communication technique 1 [S801]. For example, the UE assumes that a signal is transmitted and received using eSL on the channel 1. In particular, it is preferable that the eSL corresponding to the communication technique 1 has the top priority on the channel 1.

In this case, if load equal to or greater than a prescribed value is measured on the channel 1, as illustrated in the step S803, it is able to check whether or not a communication technique 2 (e.g., IEEE 802.11p) is used via a channel 2 in a first monitoring gap. In this case, it is preferable that the IEEE 802.11p corresponding to the communication technique 2 has the top priority on the channel 2. The use of the communication technique 1 via the channel 2 is prohibited within the first monitoring gap.

In addition, as illustrated in the step S805, it is able to check whether or not a communication technique 3 (e.g., LTE SL) is used via a channel 3 in a second monitoring gap. Of course, it is preferable that the LTE SL corresponding to the communication technique 3 has the top priority on the channel 3. The use of the communication technique 1 via the channel 3 is prohibited within the second monitoring gap.

Lastly, if it is checked that the communication technique 2 via the channel 2 is not used or the communication technique 3 via the channel 3 is not used, the UE can transmit and receive a signal using the communication technique 1 via the channel 2 or the channel 3. [S807]. In this case, if both the channel 2 and the channel 3 are in an idle state, one channel can be selected from among the channel 2 and the channel 3 according to a predetermined priority.

Preferably, the second monitoring gap for checking whether or not the communication technique 3 is used can be defined by an offset for the first monitoring gap for checking whether or not the communication technique 2 is used. In particular, a monitoring gap can be individually configured for each communication technique.

Or, whether or not the communication technique 2 is used and whether or not the communication technique 3 is used can be determined within a common monitoring gap. In particular, the first monitoring gap and the second monitoring gap may be the same.

Figure 9:
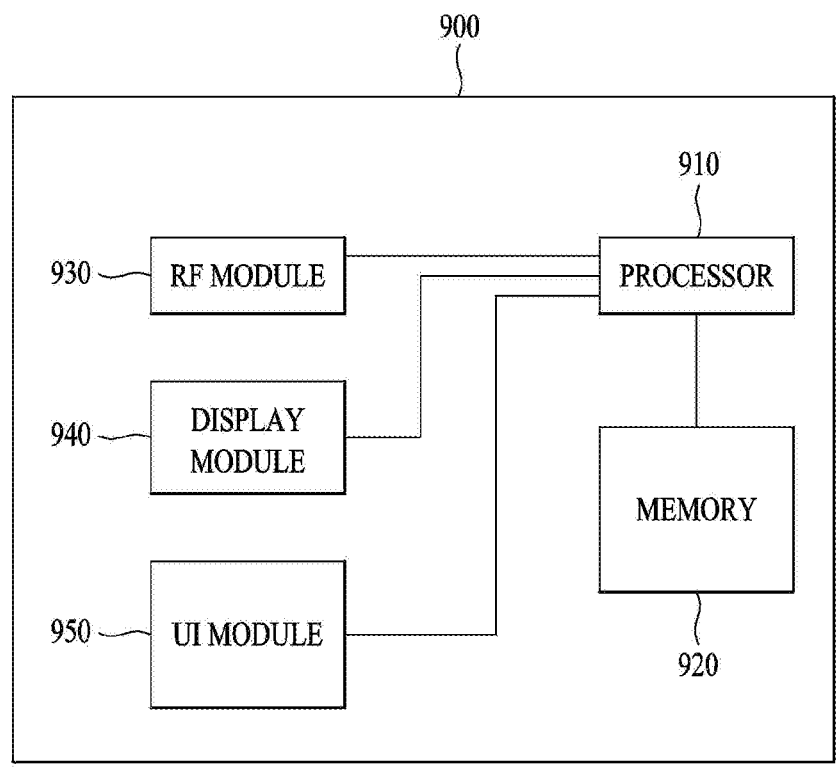
FIG. 9 is a block diagram illustrating a configuration of a communication device according to the present invention.

FIG. 9 is a block diagram of a communication apparatus according to an embodiment of the present disclosure.

Referring to FIG. 9, a communication apparatus 900 includes a processor 910, a memory 920, an RF module 930, a display module 940, and a User Interface (UI) module 950.

The communication device 900 is shown as having the configuration illustrated in FIG. 9, for the convenience of description. Some modules may be added to or omitted from the communication apparatus 900. In addition, a module of the communication apparatus 900 may be divided into more modules. The processor 910 is configured to perform operations according to the embodiments of the present disclosure described before with reference to the drawings. Specifically, for detailed operations of the processor 910, the descriptions of FIGS. 1 to 8 may be referred to.

The memory 920 is connected to the processor 910 and stores an Operating System (OS), applications, program codes, data, etc. The RF module 930, which is connected to the processor 910, upconverts a baseband signal to an RF signal or downconverts an RF signal to a baseband signal. For this purpose, the RF module 930 performs digital-to-analog conversion, amplification, filtering, and frequency upconversion or performs these processes reversely. The display module 940 is connected to the processor 910 and displays various types of information. The display module 940 may be configured as, not limited to, a known component such as a Liquid Crystal Display (LCD), a Light Emitting Diode (LED) display, and an Organic Light Emitting Diode (OLED) display. The UI module 950 is connected to the processor 910 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

Although a method of configuring a communication technique for performing direct communication between UEs in a wireless communication system and an apparatus therefor are described centering on the example applied to 3GPP LTE system, the method and the apparatus can be applied to various wireless communication systems including 3GPP LTE system.

What is claimed is:
1. A method performed by a user equipment (UE) in a wireless communication, the method comprising:
  receiving information related to a first resource pool for a first type communication that has a first priority, information related to a second resource pool for a second type communication that has a second priority, and information related a monitoring gap;
  identifying whether the second type communication is performed in the second resource pool during the monitoring gap;
  based on a traffic of the first resource pool being less than a first threshold value, transmitting a first signal in the first resource pool based on the first type communication; and
  based on the traffic of the first resource pool being greater than or equal to the first threshold value and the second type communication not being performed in the second resource pool during the monitoring gap, transmitting the first signal in the first resource pool and in the second resource pool based on the first type communication,
  wherein the first priority is higher than the second priority for the first resource pool, and wherein the second priority is higher than the first priority for the second resource pool, while the second type communication is performed in the second resource pool.

2. The method of claim 1,
wherein the first signal is transmitted in the first resource pool and in the second resource pool, based on a second signal not being transmitted in the second resource pool based on a second type communication.

3. The method of claim 2,
wherein the first signal is transmitted only in the first resource pool, based on the traffic of the first resource pool being less than a threshold value, even if the second signal is not transmitted in the second resource pool based on the second type communication.

4. The method of claim 1, wherein the first resource pool includes first partial resources and second partial resources, and
wherein the first signal is transmitted in the first partial resources based on the first type communication, based on the traffic of the first resource pool being less than a second threshold value which is smaller than the first threshold value.

5. The method of claim 4, wherein the first signal is transmitted in the first partial resources and in the second partial resources based on the first type communication, based on the traffic of the first resource pool being greater than or equal to the second threshold value and less than the first threshold value.

6. The method of claim 1, wherein the second resource pool includes third partial resources and fourth partial resources,
wherein the first signal is transmitted in the third partial resources based on the first type communication, based on the traffic of the first resource pool being greater than or equal to the first threshold value and less than a third threshold value,
wherein the third threshold value is larger than the first threshold value.

7. The method of claim 6, wherein the first signal is transmitted in the third partial resources and in the fourth partial resources based on the first type communication, based on the traffic of the first resource pool being greater than or equal to the third threshold value and less than a fourth threshold value,
where the fourth threshold value is larger than the third threshold value.

8. A user equipment (UE) configured to operate in a wireless communication, the UE comprising:
a transceiver; and
at least one processor coupled to the transceiver and configured to:
receive, via the transceiver, information related to a first resource pool for a first type communication that has a first priority, information related to a second resource pool for a second type communication that has a second priority, and information related a monitoring gap;
identify whether the second type communication is performed in the second resource pool during the monitoring gap;
based on a traffic of the first resource pool being less than a first threshold value, transmit, via the transceiver, a first signal in the first resource pool based on the first type communication; and
based on the traffic of the first resource pool being greater than or equal to the first threshold value and the second type communication not being performed in the second resource pool during the monitoring gap, transmit, via the transceiver, the first signal in the first resource pool and in the second resource pool based on the first type communication,
wherein the first priority is higher than the second priority for the first resource pool, and
wherein the second priority is higher than the first priority for the second resource pool, while the second type communication is performed in the second resource pool.

9. The UE of claim 8, wherein the first signal is transmitted in the first resource pool and in the second resource pool, based on a second signal not being transmitted in the second resource pool based on a second type communication.

10. The UE of claim 9, wherein the first signal is transmitted only in the first resource pool, based on the traffic of the first resource pool being less than a threshold value, even if the second signal is not transmitted in the second resource pool based on the second type communication.

11. The UE of claim 8, wherein the first resource pool includes first partial resources and second partial resources, and
wherein the first signal is transmitted in the first partial resources based on the first type communication, based on the traffic of the first resource pool being less than a second threshold value which is smaller than the first threshold value.

12. The UE of claim 11, wherein the first signal is transmitted in the first partial resources and in the second partial resources based on the first type communication, based on the traffic of the first resource pool being greater than or equal to the second threshold value and less than the first threshold value.

13. The UE of claim 8, wherein the second resource pool includes third partial resources and fourth partial resources,
wherein the first signal is transmitted in the third partial resources based on the first type communication, based on the traffic of the first resource pool being greater than or equal to the first threshold value and less than a third threshold value,
wherein the third threshold value is larger than the first threshold value.

14. The UE of claim 13, wherein the first signal is transmitted in the third partial resources and in the fourth partial resources based on the first type communication, based on the traffic of the first resource pool being greater than or equal to the third threshold value and less than a fourth threshold value,
where the fourth threshold value is larger than the third threshold value.

15. A processing apparatus configured to control a user equipment (UE) to transmit a signal in a wireless communication, the processing apparatus comprising:
at least one processor; and
at least one computer memory operably connectable to the at least one processor and storing instructions that, based on being executed by the at least one processor, perform operations comprising:
receiving information related to a first resource pool for a first type communication that has a first priority, information related to a second resource pool for a second type communication that has a second priority, and information related a monitoring gap;
identifying whether the second type communication is performed in the second resource pool during the monitoring gap;

based on a traffic of the first resource pool being less than a first threshold value, transmitting a first signal in the first resource pool based on the first type communication; and based on the traffic of the first resource pool being greater than or equal to the first threshold value and the second type communication not being performed in the second resource pool during the monitoring gap, transmitting the first signal in the first resource pool and in the second resource pool based on the first type communication, wherein the first priority is higher than the second priority for the first resource pool, and wherein the second priority is higher than the first priority for the second resource pool, while the second type communication is performed in the second resource pool.

16. The processing apparatus of claim 15, wherein the first signal is transmitted in the first resource pool and in the second resource pool, based on a second signal not being transmitted in the second resource pool based on a second type communication.

17. The processing apparatus of claim 16, wherein the first signal is transmitted only in the first resource pool, based on the traffic of the first resource pool being less than a threshold value, even if the second signal is not transmitted in the second resource pool based on the second type communication.

18. The processing apparatus of claim 15, wherein the first resource pool includes first partial resources and second partial resources, and wherein the first signal is transmitted in the first partial resources based on the first type communication, based on the traffic of the first resource pool being less than a second threshold value which is smaller than the first threshold value.

19. The processing apparatus of claim 18, wherein the first signal is transmitted in the first partial resources and in the second partial resources based on the first type communication, based on the traffic of the first resource pool being greater than or equal to the second threshold value and less than the first threshold value.

* * * * *